United States Patent Office 3,099,562
Patented July 30, 1963

3,099,562
PREPARATION OF HEAT-COAGULABLE PROTEIN
William I. Rogers, Carlisle, Mass., assignor to General Foods Corporation, White Plains, N.Y., a corporation of Delaware
No Drawing. Filed Jan. 5, 1962, Ser. No. 164,610
14 Claims. (Cl. 99—18)

This invention relates to the preparation of heat-coagulable protein and more specifically to a heat-coagulable protein prepared from fish.

As is well known to those skilled in the art, heat-coagulable proteins find wide use in industry and particularly in the food industry as a component of mixtures employed in baking, and for the preparation of toppings. One of the more common food uses of a heat-coagulable protein is in the production of an angel-food type cake wherein the heat-coagulable protein may be egg white. This material, like many other heat-coagulable proteins, may form an airy foam on whipping which in due course will fall. On heating this foam of heat-coagulable protein together with other ingredients, the protein coagulates to form a more-or-less rigid matrix or skeleton which provides the support for other ingredients such as sugar, flavor, etc.

Coagulation of protein under these conditions may result from various reactions including physical and/or chemical reactions which are initiated or energized by heat. Most commonly, however, coagulation is thought of in terms of its macroscopic features—particularly an apparent hardening of a protein foam or dispersion to yield a more-or-less rigid matrix.

To a large extent, most of the components of mixtures containing heat-coagulable protein are very economical. The main component which is characterized by its high price is the heat-coagulable protein, which is commonly egg white. Accordingly prior art investigators have long studied the problem of obtaining a relatively cheap heat-coagulable protein which would be characterized by substantially the same desirable heat-coagulation properties as those which characterize the more expensive egg white. Among these properties are the stability, as well as the ease and reproducibility of coagulation when the protein is subjected to heat.

A wide variety of substitutes have been tried, but many of these have proven to be unsatisfactory because of high price, low availability, poor stability, inability to hold any appreciable amount of other components, incompatability with other ingredients, or undesirable color. Accordingly there are no presently-available low-cost, heat-coagulable proteins which can be employed as a substitute for egg white or the like.

It is an object of this invention to provide a technique for obtaining a high-quality, low-cost, heat-coagulable protein from fish.

In accordance with certain aspects of this invention, a heat-coagulable protein may be prepared from fish by a process which comprises subjecting whole fresh fish or portions of fresh fish containing substantial amounts of fish muscle to mild extraction conditions in the presence of an aqueous extraction liquor thereby solubilizing at least a portion of the heat-coagulable protein content thereof, and isolating said heat-coagulable protein.

The raw materials which may be treated in accordance with this invention include fresh fish. More specifically, the fish which may be employed includes at least those portions of the whole fish which contain substantial amounts of fish muscle. Although the whole fish may be employed, it is preferred to use fillets.

Fish is said to be fresh, as the term is used herein, when it is free of undesirable fish odors, of any indications of rancidification of the natural oils, or of any evidence of undesirable bacterial degradation characterized by undue softness of the flesh and generally non-bland odor. More specifically, it may refer to fresh fish which has been stored at room temperature for not more than one day; fish refrigerated at 35° F. for less than 5–9 days; or fish refrigerated at 0° F. for less than 4 months and preferably less than 6 weeks.

It is a feature of this invention that the raw material may be either a low-oil fish such as cod or haddock (typically 1%–2% oil) or a high-oil (typically 5%–20%) fish such as menhaden, herring, mackerel, king salmon, sardine, or pilchard. However, the advantages of this invention are particularly apparent when high-oil fish are employed.

In the preferred embodiment, the fish charge, whether in the form of whole fish or fish fillets, is gently comminuted (i.e. shredded) under conditions which minimize shearing, aerating, foaming, or other undesirable denaturing. This may be effected in a screw-type grinder such as a Hobart mill, to give a product most of which will pass through a 16–20 mesh screen on which the bulk of the bones and scale may be retained.

This comminuted fish is then slurried with or dispersed in 1–10, preferably 5 volumes, of dispersing liquid, typically water. When the fish charge is frozen as in the case of frozen cod fillets, it may be desired to effect comminution and slurrying simultaneously by comminuting the frozen fish in the presence of a dispersing liquid.

In accordance with this invention, the fish which has been mixed with water and which is in slurry form is then subjected to mild extraction conditions. The slurry is maintained at temperatures below 30° C. and down to just above 0° C. At extraction temperatures of above 30° C. the yield or amount of heat coagulable protein extracted diminishes to a point so slight as to render further processing of the extracted product unfeasible due to the subsequent losses incident to solubilizing, enzymolyzing, and isolating the heat coagulable protein. A preferred extraction temperature is 5° C. and, at this lower temperature, the amount of extract may be e.g. 15%–20% greater than that attained at about 30° C. The preferred time of extraction is 0.25–0.50 hours, although the yield of product may be increased by as much as 14% if the extraction be continued for up to 24 hours. The extraction may be effected in one or more steps, and if two steps be used, the yield may be increased by as much as 35%.

During the period when the fish in slurry form is being subjected to extraction conditions, it is believed that the main effects are a favorable denaturing and an extraction of solubles from the fish. More particularly, it is believed that proteinaceous nitrogen-containing moieties in the fish and especially those in the fish muscle, including water-souble albumins and globulins, may be leached out or extracted.

The extract liquor comprises a solution of proteins including e.g. alubmins and globulins. More specifically, the liquor may have a protein content of 0.6% to 0.8%, say 0.7%, and the yield of soluble protein may typically be 3%–4% of the wet weight of the fresh fish. The amount of protein in the aqueous solution may correspond to about 20% of the protein content of the fish.

When the extracting medium which is employed is substantially pure water, namely water to which no salt has been added as hereinafter discussed, the extract liquor will contain primarily the albumins and the globulins, these being the two water-soluble components of the original fish muscle, and they compose typically as much as 20% of the fish muscle. The actomyosin fraction of the fish muscle, which comprises as much as 70% of the fish muscle, is substantially insoluble in water, to which no salt has been added, as hereinafter discussed. If desired, the extract of globulins and albumins may be isolated as hereinafter disclosed in detail to obtain a heat-coagulable protein.

According to a preferred embodiment of this invention, however, it is possible to increase the amount of heat-coagulable protein recovered by as much as 300% or more, and to raise the recovery from about 20% of the protein found in the fish to about 60%–65% of the protein found in the fish. More specifically, this may be accomplished by use of a saline or salt-containing extracting medium. The term "saline" may include any salt-containing extracting medium. However, the preferred salt is sodium chloride, and such salt is present in the extracting medium in concentrations of 1% to 5%, preferably 2%. While sodium chloride is indicated as the preferred salt due to its beneficial effect in increasing the diffusion or extraction of the heat coagulable protein, together with its great economy and cheapness, it is understood that other alkali metal salts and alkaline earth metal salts may be used in place of sodium chloride. In fact, the addition of any soluble metal salt to the extraction water will serve to increase the diffusion or solubility of the heat coagulable protein. The operable temperature range of the saline extraction is the same as that for the pure water extraction and although the yield of heat coagulable protein extracted at above 30° C., say 35° C., is increased somewhat over that obtained with pure water extraction, this yield is still too small to provide enough extraction product for further processing.

The saline extraction solution may contain up to 90% of the entire protein content of the treated fish and may have a protein content of about 9% to 45% protein based on the total weight of saline extraction solution. More typically, however, the protein content of the solution will be about 18%.

The saline extract liquor, containing albumin, globulin, and actomyosin may be subjected to enzymolysis to convert the actomyosin therein to (a) about 60% of heavy actomeromyosin, and (b) about 40% of light meromyosin. More specifically, in the preferred embodiment of this invention, the protein may be enzymolyzed, or subjected to enzymatic digestion, to give the desired product by adjusting the pH of the solution to 7–8, preferably 7, by addition of sodium hydroxide, typically in dilute solution of 0.1 N. Enzymolysis may be effected by use of a proteolytic enzyme such as trypsin, pancreatin, etc. The preferred enzymes are those which have tryptic-like activity, and preferably trypsin. Pancreatic-derived enzymes including commercial pancreatin may be employed. The enzyme, for example, trypsin, may be added to the solution of solubilized protein in amount of 0.01% up to 0.1%, preferably 0.02% to 0.05% of the protein, i.e. of the solids in the extract liquor. This may correspond to about 0.06% up to about 0.6%, say 0.12%–0.3% by weight of the fresh fish which has a protein content of about one-sixth of its weight. When other enzymes are employed, the amount used may be adjusted to compensate for the varying potencies thereof, and to permit use of the trypsin-equivalent amount thereof.

The temperature of the enzymolysis will be below about 40° C. to minimize coagulation of the native protein, and it will usually be 25° C. to 0° C., preferably at 5° C. Although the yield of soluble protein may increase as the temperature drops from 40° C. to 25° C. (e.g. by as much as 100% in one pair of comparative examples), the solubility of the product decreases. Enzymolysis in the preferred embodiment may typically be continued for about 60 minutes. When the temperature of digestion is 25° C. to 40° C., the preferred time may be 30 minutes to 4 hours. Under these conditions, the yield may be 7% to 14% of the whole fresh fish. If desired, longer times may be employed, in which case the amount of enzyme may be proportionately decreased. If it be desired to complete the reaction more slowly, the temperature of the enzyme may be decreased. Operation at the higher temperature may permit attainment of a product characterized by higher quality protein characterized by low odor and high solubility. As the digestion continues, the viscosity of the solution decreases considerably. For example, in one case when trypsin was employed at 25° C. to digest a solublized cod fillet, the viscosity (measured in a Brookfield viscometer at 15° C.) dropped from about 980 centipoises to about 40 centipoises after about 10 minutes. The course of the reaction may be determined by observing this fall to a low viscosity.

After the digestion-enzymolysis has been continued for the desired time, the reaction mixture is modified to inhibit further enzyme activity. If desired, the reaction may be inhibited by cooling or by changing the pH so that it falls outside of the range 7–8. This may be done by lowering it to pH 4.5–5.5, say pH 5, or raising it to pH 9.5–10.5, say pH 10.

At the completion of the digestion with enzymes, the saline liquor will comprise a solution of albumin, globuin, heavy actomeromyosin, light meromyosin, and a small amount of actomyosin which may not have been enzymolyzed.

Treatment of this mixture to give a salt-free, heat-coagulable protein may be effected by dialysis. During dialysis, the saline liquor may be placed in a dialysis apparatus and dialyzed against preferably tap water. This removes the salt from the liquor. In the preferred embodiment, dialysis may be effected preferably at a pH which may be 4–9, but preferably 4.5 to 6.0, say 5.6. If dialysis be effected at pH below 6, the salt-water-soluble but water-insoluble light meromyosin precipitates, and the liquid should preferably be filtered to remove light meromyosin before further treatment. It is found that dialysis in the preferred range permits attainment of good yields of product of high quality—specifically product which is substantially odorless. If it be desired to obtain a product wherein a fish-like odor is not undesirable, it is possible to increase the yield by as much as 100% to 300%, say 150% by operating at somewhat higher pH e.g. up to 6–9, say 6.8. Dialysis may be continued for as long as 20 to 120, say 72 hours; a more pure product can be obtained by a long dialysis or a highly-efficient dialysis for a shorter time.

Further treatment of the dialyzed sol may include isolation of the soluble protein which is contained therein if the product be desired in dry form. This may be effected by drying e.g. freeze-drying, typically at pressure less than about 40 microns Hg, say 20 microns Hg. Spray-drying or vacuum drum-drying may be employed. Preferably, however, isolation of the desired product may be effected by solvent precipitation.

Isolation of the heat-coagulable protein (whether prepared from aqueous extraction, or from saline extraction with or without enzymolysis) within the sol may also be effected by solvent precipitation with preferably alcohol. In the preferred embodiment, the solvent may be ethanol, and precipitation may be effected by mixing the sol at temperature of −5° C. to 15° C., say 5° C. and pH of 6 to 8, say pH 7 with ethanol at −60° C. to 10° C., say minus 5° C. to minus 15° C. The quantity of alcohol will preferably be controlled to provide a final alcohol concentration of 40%–50%, say 50% in the mixture. Temperature during the alcohol precipitation should be maintained preferably less than about 5° C.

In accordance with one embodiment of this step, 95% ethanol was added to the sol until the ethanol concentration rose to 40%–50%, the mixture being maintained at less than 5° C. The precipitated heat-coagulable protein may be separated as by filtration and washed several times with e.g. 50% ethanol.

The so-prepared heat-coagulable protein may be characterized by its light color and by its freedom from strong offensive odor, etc. More particularly the product of this invention is characterized by its ease of heat coagulation. The product of this invention may have superior whipping properties and it will typically have an overrun which is at least about equal to, and frequently 25%–30% greater than a standard egg albumin. Furthermore this maximum overrun may frequently be obtained in a time which may be no longer than the time to obtain the maximum (but lower) overrun with egg albumin.

This newly-prepared, heat-coagulable protein may be characterized by its ease of coagulation when subjected to heat and by its low cost. It may be noted that the novel product of this invention will effect heat coagulation when present in amount of as low as 1% of a mixture, whereas egg white will not function similarly at concentrations below about 5%.

The coagulation temperature of this novel heat-coagulable protein is 60–90° C., and it may readily be at the lower portion of this range. It is a particular feature of this novel product that if it be at pH close to its isoelectric pH of about 6.0, the maximum amount of protein (as much as e.g. 82% of the protein in solution) may be heat-coagulated at low temperature of about 65° C. In the preferred embodiment, the pH of the protein may be maintained at about 6–7 and at this pH, the coagulation temperature will be about 65° C., rising as the pH approaches 7 to a value of about 87° C.

The heat-coagulable protein of this invention may be used in any one of a wide variety of food uses and a preferred use may be in cake mixes of the angel-food type. Among the non-food uses wherein this product may be employed may be as an ingredient in fire-fighting foams, adhesives and glues, sponge-forming compositions, soaps, insulation, multicellular building material, etc.

The technique of this invention may be illustrated by reference to the following examples.

*Example I*

In this example, 60 g. of fresh cod muscle was extracted with 300 ml. water at 7° C. in a Waring Blendor. After 5 minutes of mixing, the slurry was centrifuged for 15 minutes at 24,000 r.p.m. in a Sharples Supercentrifuge. Analysis of the supernatant liquor indicated a concentration of 0.69% protein.

The solution containing the desired product was freeze-dried at 15 microns pressure for 16 hours to give a solid product weighing 2.46 g. (4.1% of the fresh fish muscle, about 20.5% of the total fish protein, and approaching 100% of the albumin content of the muscle).

The whipping properties of this material were tested by adding one gram thereof to 100 ml. of water (which optionally may be buffered to pH 7 with a citrate-phosphate buffer). The mixture was allowed to stand for about 15 minutes before whipping; and it was whipped in a Sunbeam (#1406) mixmaster at highest speed. The whip reached its maximum overrun of 200% in one minute (about the same overrun as attained by egg albumin) and the whip became stable after about 5 minutes.

The fish foam was lighter in density and texture than a corresponding foam prepared from egg albumin; it was more stable on addition of fat than was the egg-foam.

Heat coagulability of the whipped protein was demonstrated by placing the whipped fish foam in a mold and placing this in an oven for 60 minutes at 70° C. The whip coagulated to produce a hard confection-like product which was of low density.

Production of a sugary confection can be readily effected by adding 120 g. of sugar and 0.1 g. of vanilla flavor to a 1 g. aliquot of the whipping agent in 100 ml. of water. Preferably the sugar and the flavor may be folded in after the mixture has been whipped. The whip may be placed in an oven at e.g. 70° C. for 60 minutes to yield a white, light, airy, foamy cake or cookie which is pleasant to taste.

*Example II*

In this example, 150 g. of fresh cod muscle was comminuted in a Waring Blendor with fresh extraction liquor which was 750 ml. of cold (5° C.) 3% solution of sodium chloride for 2 minutes. The liquor was removed and the solids contacted again with an equal aliquot of fresh extraction liquor under the same conditions. The extracts were combined, and the pH adjusted to 7.6 with 0.1 N sodium hydroxide solution.

The temperature was raised to 23° C. and 75 ml. of 0.1% trypsin solution (in 0.0025 N hydrochloric acid) was added with stirring. After 10 minutes, the enzymolysis was arrested by addition of 75 ml. of a 0.1% solution of crystallized soybean trypsin inhibitor. The liquor was placed in cellophane bags and dialyzed for 20 hours against tap water at pH 5.6 and at 7° C., which removed the salt from the enzymolyzed liquor. The liquor was clarified by centrifugation in an International Refrigerated Centrifuge at 2000 r.p.m. and 5° C. for one hour. Insolubles consisting of stroma and light meromyosins were thus removed and the clarified liquor was freeze-dried at 15 microns to give a dry heat-coagulable protein in amount equal to 13.8% by weight of the fresh fish.

The whipping and heat-coagulation properties of this embodiment were similar to those of the embodiment of Example I.

The present application is a continuation-in-part of Serial No. 820,594 filed June 16, 1959, now abandoned.

While there have been described certain detailed aspects of this invention and specific embodiments by which it may be practiced, it will be apparent to those skilled-in-the-art that the invention is not limited specifically to these disclosed aspects, but that changes may be made therein which fall within the scope of the invention.

What is claimed is:

1. A process of preparing a heat coagulable protein which comprises subjecting fresh fish containing substantial amounts of fish muscle to mild extraction conditions in the presence of an aqueous extraction liquid at a temperature of 0° to 30° C. to solubilize at least a portion of the heat-coagulable protein content of said fish, and isolating said coagulable protein in solution.

2. The process of claim 1 wherein the fish is comminuted under gentle conditions which prevent denaturing of the protein.

3. The process of claim 2 wherein the aqueous extraction liquid is present in an amount having a ratio of comminuted fish to aqueous liquid of 1:1 to 1:10.

4. The process of claim 3 wherein the aqueous extraction liquid is a saline extraction liquid having a salt concentration of 1 to 5%.

5. The process of claim 4 wherein the saline extraction solubilizes at least a portion of the albumin, globulin and actomyosin content of said fish; enzymolyzing said solubilized protein at a temperature of 0° to 40° C. to convert the actomyosin fraction thereof to heavy actomeromyosin and light meromyosin prior to isolating said heat coagulable protein of albumin, globulin. light meromyosin, and heavy actomeromyosin.

6. The process of claim 4 wherein the saline extraction solubilizes at least a portion of the albumin, globulin, and actomyosin content of said fish; enzymolyzing said solubilized protein at a temperature of 0° to 40° C. to convert the actomyosin fraction thereof to heavy actomeromyosin and light meromyosin, and dialyzing said solution to remove the salt content of the heat-coagulable protein solution prior to isolating said heat-coagulable protein of albumin, globulin, light meromyosin, and heavy actomeromyosin.

7. The process of claim 4 wherein the saline extraction solubilizes at least a portion of the albumin, globulin, and actomyosin content of said fish; enzymolyzing said solubilized protein at a temperature of 0° to 40° C. to convert the actomyosin fraction thereof to heavy actomeromyosin and light meromyosin, and dialyzing said solution of heat-coagulable protein at a pH less than 6 to thereby remove salt from said solution while precipitating the light meromyosin content thereof, and isolating from the solution the heat-coagulable protein fractions of albumin, globulin, and heavy actomeromyosin.

8. The process of claim 4 wherein the saline extraction solubilizes at least a portion of the albumin, globulin, and actomyosin content of said fish; enzymolyzing said solubilized protein at a temperature of 0° to 40° C. to convert the actomyosin fraction thereof to heavy actomeromyosin and light meromyosin, and dialyzing said solution of heat coagulable protein at a pH greater than 6 to thereby separate salt from the solution, and isolating the heat-coagulable protein fractions of albumin, globulin, heavy actomeromyosin, and light meromyosin.

9. The process of claim 5 wherein the enzymolysis is effected by a proteolytic enzyme.

10. The process of claim 9 wherein the proteolytic enzyme is selected from the group consisting of enzymes having tryptic-like activity and enzymes having pancreatic-like activity.

11. The process of claim 9 wherein the enzyme is trypsin.

12. The process of claim 9 wherein the enzyme is pancreatin.

13. The process of claim 9 wherein the enzymolysis is continued until the viscosity of the solution decreases considerably.

14. A process of preparing a heat-coagulable protein which comprises subjecting fresh fish containing substantial amounts of fish muscle to mild extraction conditions in the presence of water at a temperature of 0° to 30° C. to solubilize the heat-coagulable albumin and globulin content of said fish while leaving as residue the actomyosin content thereof, and isolating said albumin and globulin fraction as a heat-coagulable protein.

References Cited in the file of this patent

UNITED STATES PATENTS 2,502,482    Sair et al. _____ Apr. 4, 1950

FOREIGN PATENTS 483,430    Great Britain _____ Apr. 20, 1938
539,579    Great Britain _____ Sept. 17, 1941

OTHER REFERENCES

"Egg Whites from Fish Make 'Delicious' Cake," Science News Letter for January 30, 1954, p. 66.